(12) United States Patent
Ruff

(10) Patent No.: US 11,328,882 B2
(45) Date of Patent: May 10, 2022

(54) KEY MODULE FOR A KEYBOARD, KEYBOARD, AND METHOD FOR PROVIDING A KEY TAPPET WITH A WIRE BRACKET

(71) Applicant: Cherry GmbH, Auerbach/Opf (DE)

(72) Inventor: Eduard Ruff, Auerbach (DE)

(73) Assignee: CHERRY GMBH, Auerbach/Opf (DE)

( * ) Notice: Subject to any disclaimer, the term of this patent is extended or adjusted under 35 U.S.C. 154(b) by 0 days.

(21) Appl. No.: 17/272,727

(22) PCT Filed: Sep. 10, 2019

(86) PCT No.: PCT/EP2019/074043
§ 371 (c)(1),
(2) Date: Mar. 2, 2021

(87) PCT Pub. No.: WO2020/053179
PCT Pub. Date: Mar. 19, 2020

(65) Prior Publication Data
US 2021/0358699 A1    Nov. 18, 2021

(30) Foreign Application Priority Data

Sep. 13, 2018   (DE) .................... 10 2018 122 416.8
Apr. 5, 2019    (DE) .................... 10 2019 108 956.5

(51) Int. Cl.
*H01H 13/85*      (2006.01)
*H01H 13/7073*    (2006.01)
*G06F 3/01*       (2006.01)

(52) U.S. Cl.
CPC ........ *H01H 13/85* (2013.01); *H01H 13/7073* (2013.01); *G06F 3/016* (2013.01);
(Continued)

(58) Field of Classification Search
CPC ...... H03K 17/969; H01H 13/06; H01H 13/85; H01H 13/83; G06F 3/016
(Continued)

(56) References Cited

U.S. PATENT DOCUMENTS 5,015,811 A     5/1991  Moriyama et al.
9,728,350 B2 *  8/2017  Muller .................. H01H 13/10
(Continued)

FOREIGN PATENT DOCUMENTS

DE      102014208173     11/2015

OTHER PUBLICATIONS

International Search Report for PCT/EP2019/074043 dated Nov. 14, 2019.

*Primary Examiner* — Edwin A. Leon
*Assistant Examiner* — Iman Malakooti
(74) *Attorney, Agent, or Firm* — James R. Hayne; Stites & Harbison PLLC

(57) ABSTRACT

What is presented is a key module (110) for a keyboard. The key module (110) comprises a key tappet (220) comprising a coupling portion for coupling to a keycap for the key module (110). The key module (110) also comprises a module housing (230) formed to movably accommodate the key tappet (220), in order to enable a translational actuation movement of the key tappet (220) between a rest position and an actuated position relative to the module housing (230). The key module (110) further comprises a wire bracket (560) for providing tactile and/or acoustic feedback. The wire bracket (560) is elastically deflectable in the course of the actuation movement. The wire bracket (560) is bent with an overall bending angle of less than 360 degrees. The wire bracket (560) is fixed to the key tappet (220).

15 Claims, 10 Drawing Sheets

(52) U.S. Cl.
CPC ..... *H01H 2215/03* (2013.01); *H01H 2221/03* (2013.01); *H01H 2221/044* (2013.01)

(58) Field of Classification Search
USPC ........................................................ 200/5 A
See application file for complete search history.

(56) References Cited

U.S. PATENT DOCUMENTS

| | | | |
|---|---|---|---|
| 9,972,462 B1* | 5/2018 | Chen | ...................... H01H 13/52 |
| 10,431,402 B2* | 10/2019 | Hsieh | ...................... H01H 13/04 |
| 2017/0294276 A1* | 10/2017 | Liu | ........................ H01H 3/50 |
| 2018/0074587 A1 | 3/2018 | Liu et al. | |
| 2019/0172661 A1 | 6/2019 | Hsieh et al. | |
| 2020/0043680 A1 | 2/2020 | Ruff | |

* cited by examiner

KEY MODULE FOR A KEYBOARD, KEYBOARD, AND METHOD FOR PROVIDING A KEY TAPPET WITH A WIRE BRACKET

The present invention relates to a key module for a keyboard, to a keyboard having at least one such key module, and to a method for providing a key tappet of a key module for a keyboard with a wire bracket for providing tactile and/or acoustic feedback.

Different types of key switches may be employed in keyboards typically used in connection with computers. In particular, mechanical key modules can be used as a key switches. There are different types of mechanical key modules. A key module having a lid element, a tappet, a contact element unit, a contact piece and a housing element is described in post-published DE 10 2017 106 406 A1. The feedback concerning actuation of such key switches or key modules may take place in a tactile and additionally or alternatively acoustic manner.

Against this background, the present invention provides an improved key module for a keyboard, an improved keyboard, and an improved method for providing a key tappet of a key module for a keyboard with a wire bracket for providing tactile and/or acoustic feedback according to the main claims. Advantageous embodiments can be seen from the dependent claims and the subsequent description.

According to embodiments of the approach described here, in particular, a key module with tactile feedback or with tactile and acoustic feedback upon actuation can be provided. The feedback may here be provided by a wire bracket. The wire bracket may be configured to provide the tactile feedback or tactile and acoustic feedback for the key module. The wire bracket may be exclusively or completely arranged in a movable component of the key module, more specifically in a key tappet of the key module. The wire bracket may be bent and comprise at least one bending location, for example, wherein an overall bending angle of all bending locations of the wire bracket is smaller than 360 degrees.

Advantageously, in particular, a click which is noticeable in a haptic or tactile way as tactile feedback and optionally in addition an acoustically perceptible click as acoustic feedback may thus be provided in a reliable manner by means of only the wire bracket. The wire bracket can be manufactured in an easy and inexpensive way. The wire bracket may also be accommodated in a space-saving manner in the key module. Furthermore, also a simple manufacturing method of the key module may thus be enabled, particularly also with respect to the fabrication of the key tappet and the introduction of the wire bracket. The wire bracket may also influence, in a defined manner, a force-displacement characteristic regarding actuation of the key module. In particular, the wire bracket may provide the tactile and optionally additional acoustic feedback in an inexpensive, space-saving and simple manner as compared to a leg spring or portion spring, because otherwise elaborate housing for a spring body, in particular a winding part, can be simplified because an otherwise required fixed mounting of one leg of the leg spring or torsion spring can be omitted and because the wire bracket may be bent directly and installed into the key tappet or may be bent into its final shape during installation and thus the key tappet may be provided with the wire bracket in a single process instead of fabrication in a separate process or complex feeding in a switch mounting machine.

What is presented is a key module for a keyboard, wherein the key module comprises:

a key tappet, wherein the key tappet comprises a coupling portion for coupling to a keycap for the key module;

a module housing, wherein the module housing is formed to movably accommodate the key tappet, in order to enable a translational actuation of the key tappet between a rest position and an actuated position relative to the module housing; and a wire bracket for providing tactile and/or acoustic feedback, wherein the wire bracket is elastically deflectable in the course of the actuation movement, wherein the wire bracket is bent with an overall bending angle of less than 360 degrees, wherein the wire bracket is fixed to the key tappet.

The keyboard may be provided for a computer or the like, for example. The keyboard may comprise at least one key module. The key module may be part of a key or may represent a key. Thus, one key module per key may be provided. The key module may also be referred to as a mechanical push-button or mechanical push-button switch. The key tappet may be integrally formed. The elastic means may be a compression spring. The elastic means may function as a return spring for the key module. The elastic means may cause a linear force-displacement characteristic in the course of the actuation movement. In other words, the elastic means may comprise a linear spring characteristic. Alternatively, the elastic means may comprise a progressive spring characteristic. The wire bracket may be bent from a metal wire having a predefined diameter. The wire bracket may be formed to provide the tactile and/or acoustic feedback in the course of the actuation movement. The overall bending angle may correspond to a sum of bending angles of all bending locations of the wire bracket at which the wire bracket is bent. The wire bracket may also be referred to as a clip, click bracket or generally as an elastic means. The wire bracket may be formed of metal wire or plastics wire.

According to an embodiment, the wire bracket may comprise a first bending region and a second bending region. The wire bracket may be bent less than 180 degrees in the first bending region. The wire bracket may be bent between 45 and 135 degrees in the second bending region. In a non-deflected state of the wire bracket, the wire bracket may be bent between 80 and 100 degrees in the second bending region. The first bending region may be arranged between an end of the wire bracket fixed to the key tappet and a first straight portion of the wire bracket. The second bending region may be arranged between the first straight portion and a second straight portion of the wire bracket. The second straight portion may be longer than the first straight portion. The second straight portion may be arranged between the second bending region and a free end of the wire bracket. The second straight portion and the free end of the wire bracket may be elastically deflectable relative to the first straight portion in the course of the actuation movement. The end fixed to the key tappet, the first bending region, the first straight portion and at least a subsection of the second bending region of the wire bracket may be fixed to the key tappet. Such an embodiment offers the advantage that the device for tactile and additionally or alternatively acoustic feedback in form of the wire bracket can be realized in a space-saving manner and can be produced in an easy and inexpensive way.

Furthermore, the key tappet may comprise a fixing portion for fixing the wire bracket to the key tappet. The fixing portion may comprise two bearing notches for supporting the wire bracket. Each of the bearing notches may have an opening angle of less than 180 degrees. The end fixed to the key tappet, the first bending region, the first straight portion and at least a subsection of the second bending region of the wire bracket may be arranged in the fixing portion. The end fixed to the key tappet may be supported in a first one of the bearing notches, and the first straight portion may be supported in the second one of the bearing notches. The end of the wire bracket fixed to the key tappet may be wedged the first bearing notch. The wire bracket can be pressed, slid or inserted into the fixing portion. Thus, the fixing portion may function as an insertion compartment for the wire bracket. Such an embodiment offers the advantage that the wire bracket can be fixed in a simple, stable, reliable and twist-protected manner. Moreover, wire brackets from wire with different diameters can be supported safely by the bearing notches.

In particular, the wire bracket may be formed like a barbed hook in a subsection. Additionally or alternatively, the wire bracket may comprise a sharp edge on an end of the wire bracket fixed to the key tappet. The subsection formed like a barbed hook may comprise the end of the wire bracket fixed to the key tappet, the first bending portion and the first straight portion of the wire bracket. The sharp edge, and thus the subsection formed as or like a barbed hook and additionally or alternatively the fixed end, may be formed to dig, bore or cut itself into the key tappet, particularly into the fixing portion. Thus, a secure hold of the wire bracket in the key tappet, particularly in the fixing portion, can be achieved, because the wire bracket may become stably wedged. Due to the barbed-hook shape and additionally or alternatively the sharp edge of the wire bracket, robust and reliable protection against position change can be achieved, in particular against the wire bracket falling out from the key tappet.

The key tappet may also comprise an inclined surface obliquely inclined with respect to an axis of the actuation movement. The module housing may comprise a rib obliquely inclined with respect to the axis of the actuation movement and having a nose and an abutment surface inclined normally with respect to the axis of the actuation movement. The inclined surface, the rib, the abutment surface and the nose may be formed to elastically deflect and suddenly release the wire bracket in the course of the actuation movement. Such an embodiment offers the advantage that the tactile feedback can be provided in a simple and robust way. Here, the tactile feedback can be transferred to a user directly via a keycap coupled to the key tappet due to the fixing of the wire bracket thereto.

Moreover, the key tappet may comprise a projection portion with a strike surface inclined normally with respect to the axis of the actuation movement. The strike surface and the wire bracket may be formed and arranged to cause the wire bracket to strike onto the strike surface in the course of the actuation movement for the acoustic and additionally or alternatively tactile feedback. Such an embodiment offers the advantage that the acoustic feedback in form of a clicking sound can be provided in a simple and reliable manner. A property of the acoustic feedback can be adjusted by suitably choosing a diameter of the wire of the wire bracket.

Also, the key tappet may comprise a retaining portion for retaining the wire bracket against movement away from a wall of the key tappet and additionally or alternatively for retaining the wire bracket against movement transversal to an axis of the actuation movement of the key tappet in the course of the actuation movement. The retaining portion may be formed to be a protrusion or guiding protrusion. A subsection of the wire bracket may be accommodated or accommodatable between the retaining portion and the wall of the key tappet. More specifically, a subsection of the second straight portion adjacent to the second end portion of the wire bracket may be accommodated or accommodatable between the retaining portion and the wall of the key tappet. The retaining portion may be formed and arranged to effect return of a free end of the wire bracket onto the strike surface of the projection portion of the key tappet in cooperation with the inclined surface and the rib after the actuation movement. Such an embodiment offers the advantage that the elastic deflection of the key tappet over the course of the actuation movement can be realized in and exactly reproducible and reliable manner. In particular, a reliably reproducible clicking sound can be achieved.

According to an embodiment, the module housing may be integrally formed. The module housing may comprise at least one positioning protrusion for positioning the key module on a circuit substrate of the keyboard. The module housing may comprise at least one mounting portion for mounting the key module in the keyboard with positive locking and additionally or alternatively non-positive locking. The positioning protrusion may be formed as a stud, a pin or the like. The circuit substrate may be a circuit board. The mounting portion may be formed as a flange and additionally or alternatively a snap-fit or the like. The key module may be connected to the circuit substrate while avoiding an adhesive bond between the key module and the circuit substrate of the keyboard. Such an embodiment offers the advantage that a solder-free connection between the key module and the circuit substrate can be realized in a cost-saving manner. Cost may also be saved because a wider selection of materials also with less temperature resistant materials can be used for the key module depending on the ambient temperature of the operational environment. Moreover, a solder-free connection offers simple replacement of key modules by an expert or directly by the end user. This opens up an additional possibility of individual keyboard design, which may be advantageous particularly with gaming users.

Furthermore, the key tappet may comprise at least one guiding portion for guiding a translational actuation movement of the key tappet. The at least one guiding portion of the key tappet may comprise a surface portion of the key tappet. Additionally or alternatively, the at least one guiding portion of the key tappet may comprise a guiding stud formed to plunge into a bulge of the module housing in the course of the actuation movement, wherein the bulge comprises the positioning protrusion. In the rest position, the key tappet may be partially accommodated in the module housing. In the actuated position, the key tappet may be accommodated in the module housing completely or completely except for an end portion of the coupling portion. Such an embodiment offers the advantage that a sliding actuation movement of the key tappet relative to the module housing can be enabled with reliable guidance of the key tappet in the module housing.

The key tappet may also comprise a tappet stop for limiting the actuation movement. The module housing may comprise at least one housing stop for abutment against the at least one tappet stop of the key tappet in the rest position of the key tappet. The tappet stop and the housing stop may be formed to enable a latch connection or snap connection between the key tappet and the module housing, in order to hold the key tappet in the module housing. The key tappet may also comprise elastic means. The elastic means may be formed to bias the key tappet into the rest position in an assembled state the key module. Such an embodiment offers the advantage that a reliable definition of the actuation movement as well as a robust connection between the key tappet and the module housing can be made possible.

Moreover, the key tappet may be formed of translucent material or opaque material. The module housing may be formed of translucent material or opaque material. Such an embodiment offers the advantage that uniform illumination of a keycap coupleable to the key tappet can be achieved from the circuit substrate. Also, illumination of the entire module housing, and thus an environment of the keycap, can be enabled if required.

According to an embodiment, the key module may comprise a trigger element for triggering a switch signal of the key module in response to the actuation movement. The trigger element may be attached to the key tappet. The trigger element may be a contactor for electrically shorting contact pads of the circuit substrate of the keyboard. The trigger element may comprise at least one contact finger for contacting the contact pads while causing friction, wherein the contact finger is elastically deformable in the course of the actuation movement, and an attachment portion for attaching the trigger element to the key tappet. The contactor may be integrally formed. At least the at least one contact finger may be formed from electrically conductive material. In particular, the contactor may be integrally formed as a stamped and bent part from a metal material. The at least one contact finger may exhibit a linear or progressive spring characteristic upon deformation. In the rest position, the at least one contact finger may be spaced from the circuit substrate. In the actuated position, the at least one contact finger may contact the contact pads of the circuit substrate. In particular, the contactor may comprise two contact fingers, wherein the two contact fingers may again be slotted, so that for contact fingers are provided altogether. Such an embodiment offers the advantage that safety of contact can be increased, and thus a switch signal of the key module can be provided in a reliable and reproducible manner. An overall non-linear force-displacement characteristic may also be achieved by way of a combination of a spring force of the elastic element and a spring force of the at least one contact finger in the course of the actuation movement of the key module.

In particular, the key tappet may comprise a surface portion formed as a multi-sided pipe. In a region enclosed by the surface portion, an intermediate bottom may be formed. From the intermediate bottom, the coupling portion may extend in a first direction partially out of the surface portion. A guiding stud as guiding portion may extend from the surface portion in a second direction opposite to the first direction partially out of the surface portion. Thus, the coupling portion and the guiding stud may be arranged on opposite sides of the intermediate bottom. The surface portion may be a four-sided pipe with chamfered edges. The tappet stop may be formed on the surface portion. A proportion of a dimension of the surface portion with respect to a dimension of the key module along an axis of the actuation movement may be more than 75 percent, more than 80 percent, more than 85 percent or more than 90 percent, for example. Such an embodiment offers the advantage that reliable and stable guidance of the key tappet in the module housing with a lock against rotation and anti-canting protection can be achieved.

According to an embodiment, the module housing may comprise an abutment surface. The trigger element may be arranged so as to abut on the abutment surface in the rest position of the key tappet. The abutment surface may be formed at least so that the trigger element and thus the key tappet can be prevented from sliding back to a position prior to first-time actuation. Such an embodiment offers the advantage that settling vibrations of the trigger element after returning from the actuation position to the rest position can be dampened.

What is also presented is a keyboard, wherein the keyboard comprises:

at least one exemplar of an embodiment of the previously presented key module; and a circuit substrate, wherein the at least one key module is arranged on the circuit substrate.

Thus, at least one previously presented key module may be employed or used in conjunction with the keyboard. The at least one key module may be attached directly to the circuit substrate.

According to an embodiment, the circuit substrate may comprise at least one hole into which the at least one positioning protrusion of the module housing of the at least one key module is inserted. In particular, positive locking between the key module and the circuit substrate may be achieved here. Such an embodiment offers the advantage that simple and accurate positioning of the key module relative to the circuit substrate can be achieved. Additionally or alternatively, the at least one key module and the circuit substrate may be connected to each other exclusively by positive locking and additionally or alternatively by non-positive locking. The positive locking and additionally or alternatively non-positive locking between key module and circuit substrate may be affected by means of the at least one positioning protrusion and at least one mounting portion of the module housing. Such an embodiment offers the advantage that a reliable, inexpensive connection simply detachable for replacement can be realized.

At least one light-emitting diode for illuminating the at least one key module and additionally or alternatively further electronic devices may also be arranged on or in the circuit substrate. Contact pads, which may be electrically connected to each other upon actuation of the at least one key module, may also be arranged on or in the circuit substrate. The at least one light-emitting diode and additionally or alternatively the further electronic devices may be attached by means of a surface-mounting process or a soldering process. The further electronic devices may be resistors, diodes or the like. Such an embodiment offers the advantage that the key module can be kept free from electronics. Furthermore, simple illumination of the key module or the key can be achieved.

Furthermore, the keyboard may comprise a fixing element for fixing the at least one key module to the circuit substrate. The fixing element may be formed as a key frame between the circuit substrate and a keyboard top or as a keyboard top. The fixing element may be configured to engage in positive and additionally or alternatively non-positive locking with at least one mounting portion of the module housing of the key module. Such an embodiment offers the advantage that a keyboard can be realized inexpensively, wherein long-life and robust key modules can be replaced easily and allow for precise actuation.

What is further presented is a method for providing a key tappet of a key module for a keyboard with a wire bracket for providing tactile and/or acoustic feedback, wherein the method is executable using a manufacturing machine, wherein the method comprises the steps of:

feeding the key tappet and wire from a reel into the manufacturing machine;

bending the wire with an overall bending angle of less than 360 degrees using the manufacturing machine, in order to form the wire bracket;

separating the formed wire bracket from the wire on the reel using the manufacturing machine; and fixing the wire bracket to the key tappet using the manufacturing machine.

Parts of an embodiment of the previously mentioned key module may be produced by executing the method for performing. More specifically, the key tappet and the wire bracket of an embodiment of the previously mentioned key module may be provided by executing the method. In particular, the method may be executed using a single manufacturing machine.

The invention shall be explained in greater detail by way of example on the basis of the attached drawings, in which.

In the subsequent description of preferred embodiments of the present invention, the same or similar reference numerals shall be used for similarly acting elements illustrated in the various figures, wherein repeated description of these elements shall be omitted.

Figure 1:
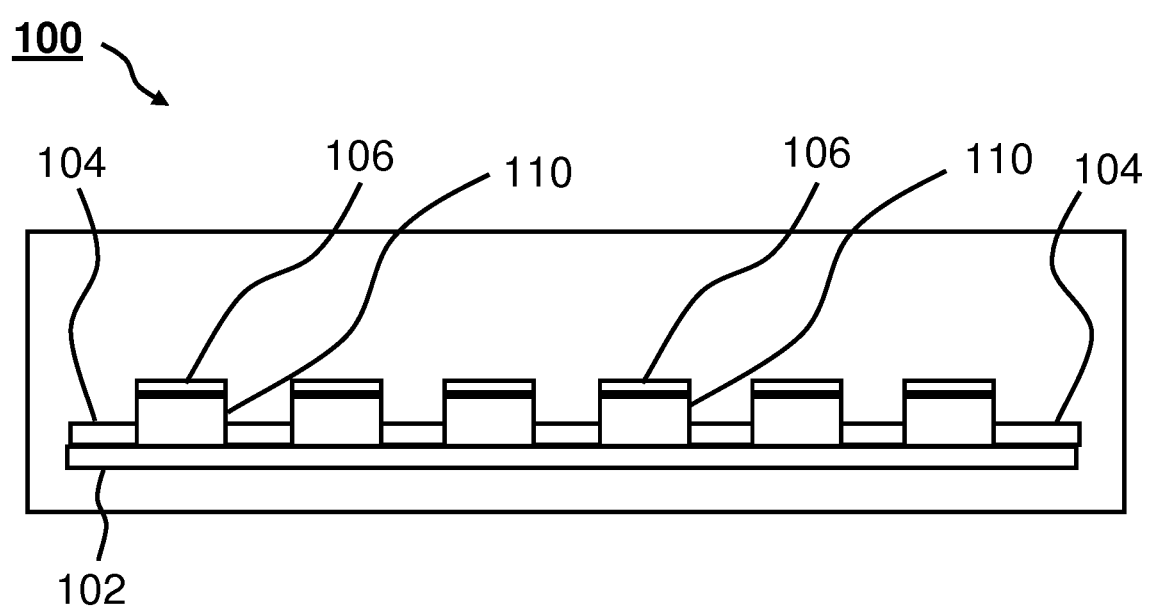
FIG. 1 shows a schematic illustration of a keyboard according to an embodiment of the present invention.

FIG. 1 shows a schematic illustration of a keyboard 100 with key modules 110 according to an embodiment. For example, the keyboard 100 is part of a notebook computer, laptop computer or the like. Alternatively, the keyboard 100 is designed as a peripheral device for a computer, in particular.

The keyboard 100 comprises a circuit substrate 102. The circuit substrate 102 is a circuit board, conductor board or the like, for example. According to the embodiment illustrated in FIG. 1, the keyboard 100 comprises a plurality of key modules 110. The key modules 110 are arranged on the circuit substrate 102.

According to the embodiment illustrated in FIG. 1, the keyboard 100 also comprises a fixing element 104 for fixing the key modules 110 to the circuit substrate 102. More specifically, the fixing element 104 is formed to establish positive locking and additionally or alternatively non-positive locking with the key module. Herein, the fixing element 104 is only exemplarily formed as a key frame. Alternatively, the fixing element 104 may be formed as a keyboard top.

Furthermore, according to the embodiment shown and described in FIG. 1, a keycap 106 is attached to each key module 110. Each keycap 106 is coupled to a key module 110 of its own. Each unit of key module 110 keycap 106 represents a key of the keyboard 100. Alternatively, each key module 110 represents a key of the keyboard 100. Particularly the key modules 110 shall be explained in greater detail with reference to subsequent figures.

The keycap 106 represents a part of a key visible and touchable for a user of the keyboard 100. Actuation of a key module 110 is effected by pressing onto the keycap 106. Each key module 110 is configured to react with a force-displacement characteristic of resistance or reset force to an actuation force. Furthermore, each key module 110 is configured to establish an electrical connection in response to actuation with a pre-definable actuation path, thereby executing a switching procedure.

Figure 2:
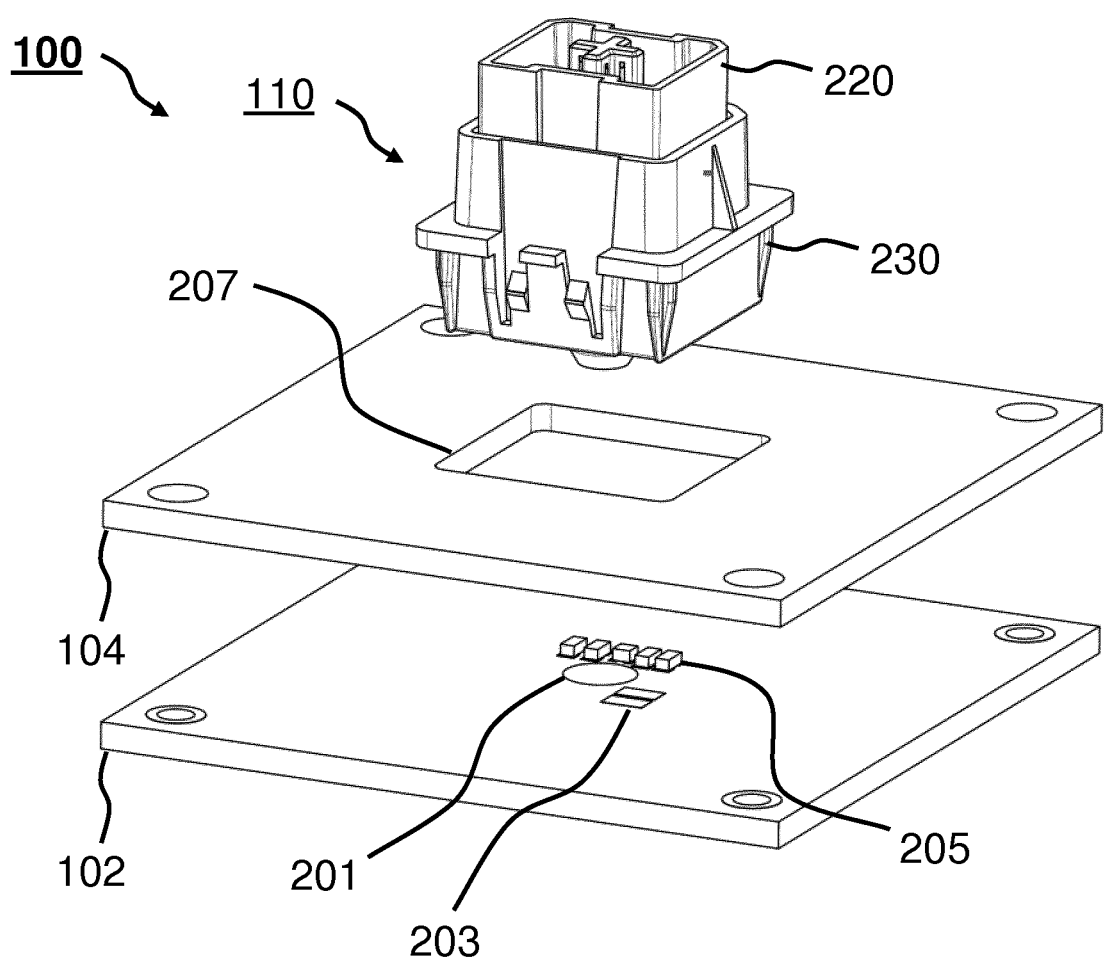
FIG. 2 shows a partially exploded view of a subsection of a keyboard according to an embodiment of the present invention.

FIG. 2 shows a partially exploded view of a subsection of a keyboard 100 according to an embodiment of the present invention. The keyboard 100 here corresponds to or resembles the keyboard from FIG. 1. The circuit substrate 102, the fixing element 104 formed as the keyframe, and the key module 110 are shown.

A hole 201 is formed in the circuit substrate 102. A positioning protrusion of the key module 110 can be introduced or inserted into the hole 201 of the circuit substrate 102. Furthermore, two electric contact pads 203 or switch pads, which can be shorted by the key module 110 in an actuation movement of the key module 110, are arranged on or in the circuit substrate 102. Moreover, according to the embodiment illustrated here, a plurality of electronic devices 205 are arranged on or in the circuit substrate 102. The electronic devices 205 are a light-emitting diode and, for example, electric resistors and/or the like. The contact pads 203 and the devices 205 are arranged in the neighborhood of the hole 201.

A holding opening 207 for being the key module 110 is formed the fixing element 104. The key module 110 can be inserted and latched in the holding opening 207. When the circuit substrate 102 and the fixing element 104 are stacked on each other, the hole 201, the contact pads 203 and the devices 205 of the circuit substrate 102 are exposed by the holding opening 207 of the fixing element 104.

A key tappet 220 and a module housing 230 are shown of the key module 110 in the illustration of FIG. 2. In an actuation movement, the key tappet 220 is movable relative to the module housing 230. The key tappet 220 is shown to be accommodated in the module housing 230 in the illustration of FIG. 2. Specifically, the key tappet 220 is shown in a rest position relative to the module housing 230 here, wherein the key tappet 220 is partially accommodated in the module housing 230 in the rest position. The key module 110 shall be explained in greater detail with reference to subsequent figures.

In other words, FIG. 2 shows an exploded view of a subsection of a keyboard 100. E.g. at least one light-emitting diode for switch illumination, resistors, diodes or sensors, for example, may be mounted on the circuit substrate 102 as the devices 205 by means of a surface-mounting process or conventional soldering process. The key module 110 is positioned on the circuit substrate 102 by means of the whole 201 and a positioning protrusion formed as a stud of the key module 110. Fixing of the key module 110 takes place by means of a snap-action connection in the holding opening 207 of the fixing element 104. According to another embodiment, a top part of the keyboard 100 may function as the fixing frame or fixing element 104. Simple assembly and disassembly for replacing the key module 110 are possible.

Figure 3:
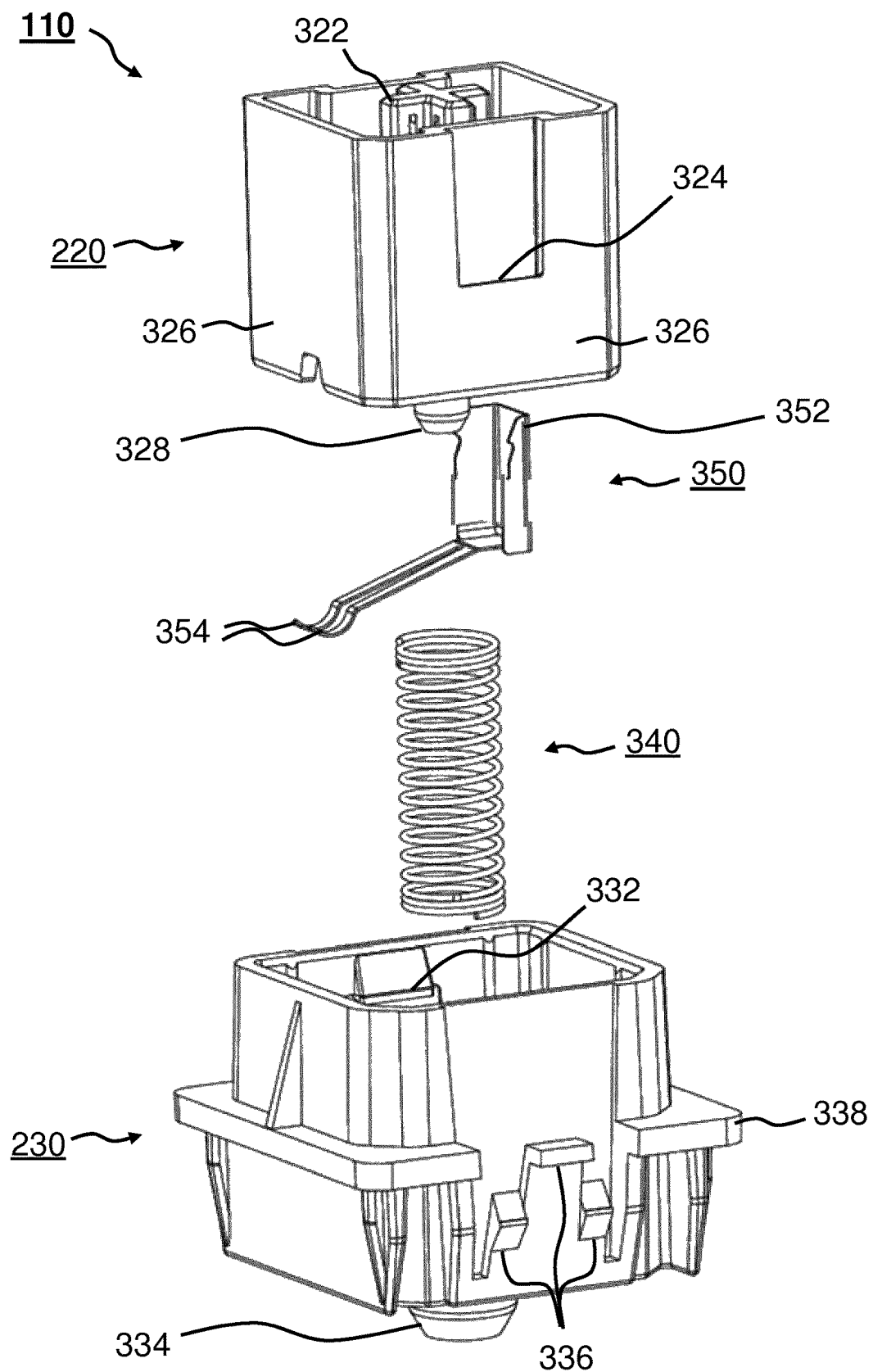
FIG. 3 shows an exploded view of the key module from FIG. 2.

FIG. 3 shows an exploded view of the key module 110 from FIG. 2. The key module 110 comprises the key tappet 220, the module housing 230, elastic means 340 and a trigger element 350.

When the key module 110 is being actuated, the key tappet 220 is translationally movable relative to the module housing 230 between a rest position and an actuated position. This is referred to as the actuation movement of the key tappet 220. According to the embodiment illustrated in FIG. 3, the key tappet 220 is integrally formed. According to an embodiment, the key tappet 220 is formed of a translucent material. Thus, uniform illumination of a keycap can be realized. According to another embodiment, the key tappet 220 is formed of an opaque material.

The key tappet 220 comprises a coupling portion 322. The coupling portion 322 is formed to be mechanically coupleable to a keycap for the key module 110. The coupling portion 322 extends along an axis of movement of the actuation movement. According to the embodiment illustrated here, the coupling portion 322 has a cross-shaped cross-sectional profile.

The key tappet 220 further comprises at least tappet stop 324 for limiting the actuation. Even though it is only implicitly shown in FIG. 3 owing to the illustration, the key tappet 220 comprises two tappet stops 324. Each of the tappet stops 324 is formed as a step, a shoulder or a ledge.

The key tappet 220 further comprises at least one guiding portion for guiding the actuation. According to the embodiment illustrated here, the key tappet 220 comprises a surface portion 326 of the key tappet 220 and a guiding stud 328 as guiding portions. The surface portion 326 is formed as a multi-sided pipe, according to an embodiment. More specifically, according to the embodiment illustrated here, the surface portion 326 is formed as a four-sided pipe with chamfered edges as a lock against rotation. In other words, the surface portion 326 is formed by outside walls of the key tappet 220 extending along the axis of the actuation movement. The guiding stud 328 also extends along the axis of the actuation movement.

The trigger element 350 of the key module 110 is configured to trigger a switch signal of the key module 110 in response to the actuation movement. More specifically, the trigger element 350 is formed to trigger the switch signal by acting on the circuit substrate of the keyboard. The trigger element 350 is attachable to the key tappet 220. In particular, the trigger element 350 is attachable to an area of the key tappet 220 closed by the surface portion 326. According to the embodiment illustrated here, the trigger element 350 is a contactor 350. The trigger element 350 comprises at least one contact finger 354 elastically deformable in the course of the actuation movement for contacting or shorting contact pads of the circuit substrate while generating friction. According to the embodiment illustrated here, the trigger element 350 for example only comprises two contact fingers 354. Furthermore, the trigger element 350 here comprises an attachment portion 352 four attaching the trigger element 350 to the key tappet 220.

The module housing 230 is integrally formed. The module housing 230 is formed to movably accommodate the key tappet 220, in order to enable the actuation movement of the key tappet 220 relative to the module housing 230. A body of the module housing 230 here is trough-shaped. According to an embodiment, the module housing 230 is formed of translucent material. Thus, ambient illumination for the keycap can be realized. According to another embodiment, the module housing 230 is formed of a brake material. In this way, illumination of the key module 110 can be restricted to the keycap.

The module housing 230 comprises at least one housing stop 332 for limitation of movement for the key tappet 220. Even though it is only implicitly illustrated in FIG. 3, the module housing 230 comprises two housing stops 332. Each of the housing stops 332 is formed to abut against a respective one of the tappet stops 324 of the key tappet 220 in the rest position of the key tappet 220. Each of the housing stops 332 is formed as a step, a shoulder or a ledge, complementary to the respective one of the tappet stops 324. The key tappet 220 can be latched and held in the module housing 230 by way of interaction of the tappet stops 324 and the housing stops 332.

Furthermore, the module housing 230 comprises at least one positioning protrusion 334. The positioning protrusion 334 is formed to position the module housing 230 and thus the assembled key module 110 on the circuit substrate of the keyboard. The positioning protrusion 334 is formed as a stud or pin. The positioning protrusion 334 extends along the axis of the actuation movement. According to the embodiment illustrated here, the positioning protrusion 334 is formed by a bulge of the module housing 230. The guiding stud 328 of the keycap 220 is formed to plunge into this bulge the course of the actuation movement.

Moreover, according to the embodiment illustrated here, the module housing 230 comprises a mounting portion 336 for mounting the key module 110 in the keyboard with positive locking and/or non-positive locking. The mounting portion 336 comprises latching protrusions or lugs for latching the fixing element, in particular in the holding opening of the fixing element of the keyboard. A flange 338 formed around the module housing 230 functions as a further mounting portion or as a stop with respect to the positive and/or non-positive locking.

According to the embodiment illustrated here, the elastic means 340 of the key module 110 is a compression spring. The elastic means 340 is configured to bias the key tappet 220 in the rest position in an assembled state of the key module 110. The elastic means 340 can be put over the guiding stud 328 of the key tappet 220. Thus, the elastic means 340 is arrangeable between the key tappet 220 and the module housing 230. The elastic means 340 may also be referred to as a return spring.

According to an embodiment, the key tappet 220 is transparent or translucent, for example, in order to uniformly illuminate symbols on the keycap. Furthermore, the module housing 230 is translucent, for example, in order to illuminate gaps between keys, or is opaque in order to leave gaps unilluminated. According to an embodiment, the actuation movement has a linear-progressive force-displacement characteristic. The elastic means 340 has a linear force-displacement characteristic. From a switching point of the key module 110 onward, the contactor 350 is increasingly biased and changes the force-displacement characteristic of the key module 110.

Figure 4:
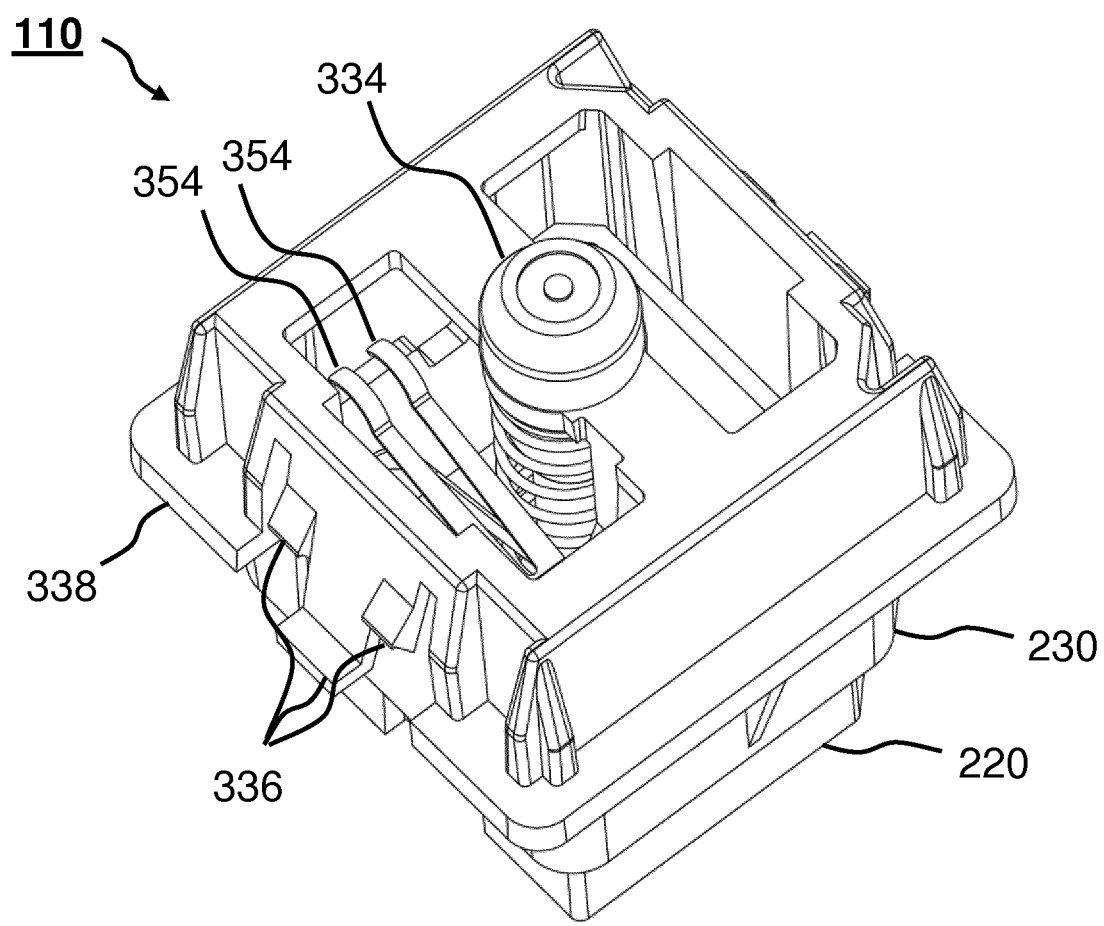
FIG. 4 shows a bottom view of a key module from FIG. 2 or FIG. 3.

FIG. 4 shows a bottom view of the key module 110 from FIG. 2 or FIG. 3. The subsection of the key tappet 220, the module housing 230 with the positioning protrusion 334, the mounting portion 336 and the flange 338, and the contact fingers 354 of the contactor are shown of the key module 110 here. Two cutouts are formed in a bottom portion of the module housing 230 which can be made to face the circuit substrate. The contact fingers 354 of the contactor pass through one of the cutouts into contact with the circuit substrate to support the contact pads. Through the other one of the cutouts, the key module 110 can be eliminated, particularly from the inside or via an inside of the key module 110, by means of a light-emitting diode on the circuit substrate.

Figure 5:
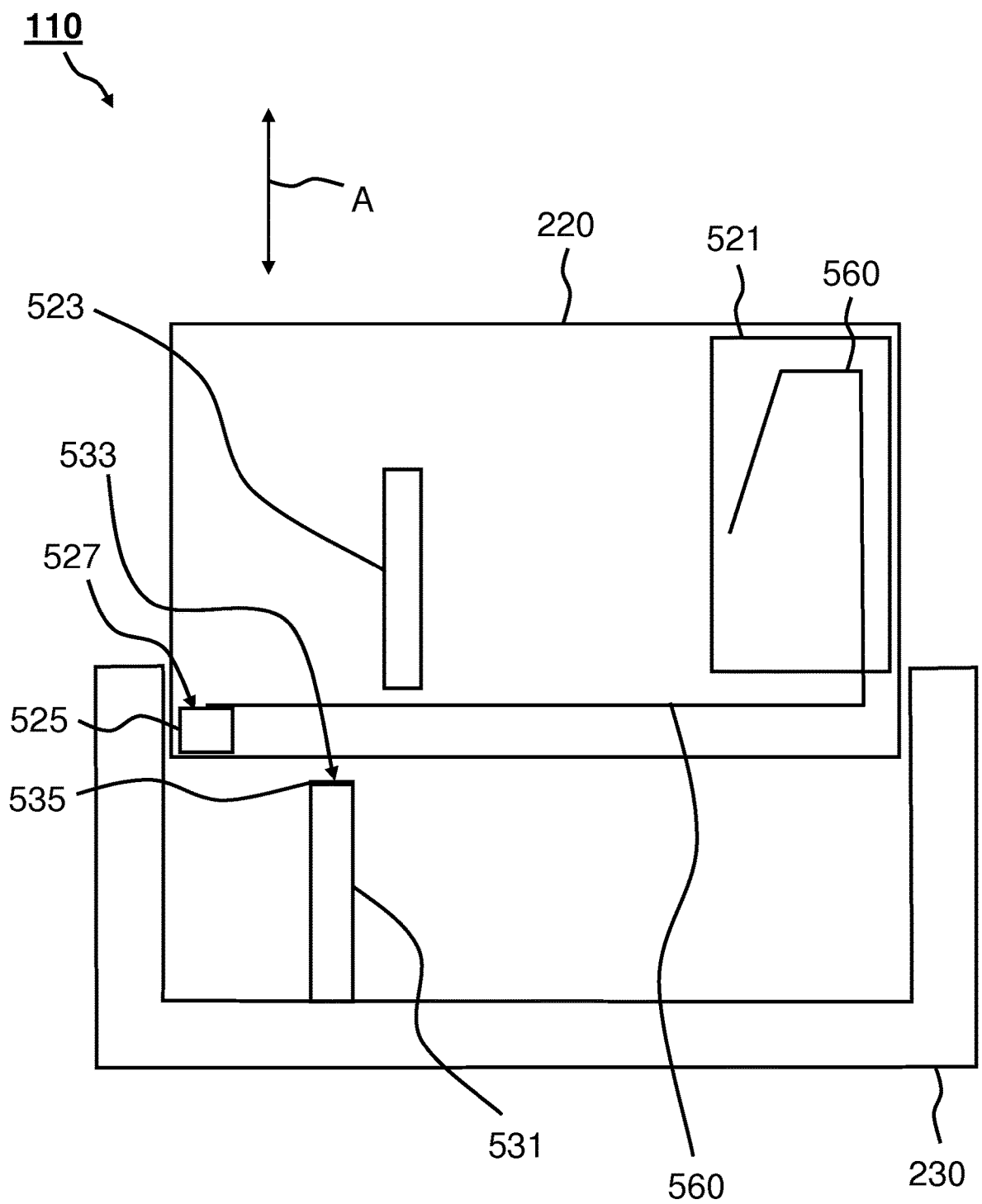
FIG. 5 shows a schematic illustration of a key module according to an embodiment of the present invention.

FIG. 5 shows a schematic illustration of a key module 110 according to an embodiment of the present invention. The key module 110 may be similar to the key module from one of the previously described figures. According to one embodiment, the key module 110 corresponds to the key module from one of the previously described figures. Thus, the key module 110 is a key module for a keyboard, such as the keyboard from FIG. 1. As an alternative, the key module 110 may be another key module known in the field with another key tappet 220 and/or another module housing 230.

The key module 110 comprises a key tappet 220. Even though it is not explicitly shown in FIG. 5 owing to the illustration, the key tappet 220 comprises a coupling portion for coupling to a keycap for the key module 110. Furthermore, the key module 110 comprises a module housing 230. The module housing 230 is formed to movably accommodate the key tappet 220, in order to enable a translational actuation movement of the key tappet 220 between a rest position and an actuated position relative to the module housing 230. The actuation movement between the rest position and the actuated position takes place along axis A or actuation axis A. In the illustration of FIG. 5, the key tappet 220 is shown in the rest position relative to the module housing 230.

The key module 110 also comprises a wire bracket 64 providing tactile and/or acoustic feedback for the key module 110 in the course of the actuation movement. To this end, the wire bracket 560 is elastically deflectable in the course of the actuation movement. The wire bracket 560 is bent from a metal wire. The wire bracket 560 is formed with an overall bending angle of less than 360 degrees. The wire bracket 560 is fixed to the key tappet 220.

According to the embodiment of the present invention illustrated in FIG. 5, the wire bracket 560 is fixed in a fixing portion 521 of the key tappet 220. The fixing portion 521 is formed as a slide-in compartment or insertion compartment for the wire bracket 560. The fixing portion 521 may also be referred to as a cavity or a recess. A subsection of the wire bracket 560 is arranged in the fixing portion 521, and a further subsection of the wire bracket 560 is arranged outside the fixing portion 521 and within the key tappet 220. The further subsection of the wire bracket 560 outside the fixing portion 521 is elastically deflectable relative to the subsection of the wire bracket 560 within the fixing portion 521 in the course of the actuation movement. The fixing portion 521 shall be explained in greater detail with reference to subsequent figures.

For deflecting the wire bracket 560, was specifically the further subsection of the wire bracket 560 outside the fixing portion 521, relative to the subsection of the wire bracket 560 within the fixing portion 521, the key tappet 220 comprises an inclined surface 523 obliquely inclined with respect to the axis A of the actuation movement, and the module housing 230 comprises a rib 531 obliquely inclined with respect to the axis A of the actuation movement and having a nose 535 and an abutment surface 533 normally inclined with respect to the axis A of the actuation movement. The inclined surface 523 is part of a land of the key tappet 220. The rib 531 at least partially protrudes into the key tappet 220. The nose 535 represents a transition portion between the abutment surface 533 and an oblique portion of the rib 535 obliquely inclined with respect to the axis A of the actuation movement. The inclined surface 523, the rib 531, the abutment surface 533 and the nose 535 are formed and arranged to elastically deflect and suddenly again release the wire bracket 560 in the course of the actuation movement. The inclined surface 523, the rib 531, the abutment surface 533 and the nose 535 are formed and arranged to deflect the wire bracket 560 at least for the tactile feedback. The deflection of the wire bracket 560 in the course of the actuation movement shall be explained in greater detail with reference to subsequent figures.

According to the embodiment of the present invention illustrated in FIG. 5, the key tappet 220 comprises a projection portion 525 with a strike surface 527 normally inclined with respect to the axis A of the actuation movement for the acoustic feedback. The strike surface 527 is formed and arranged to provide a stop for the wire bracket 560 when the same is deflected in the course of the actuation movement. The wire bracket 560 is formed to strike against the strike surface 527 when deflected in the course of the actuation movement. In other words, the strike surface 527 and the wire bracket 560 are formed and arranged to cause an impact of the wire bracket 560 on the strike surface 527 in the course of the actuation movement for the acoustic and/or tactile feedback.

According to another embodiment of the present invention, the wire bracket 560 may be shortened so that a strike or impact of the wire bracket 560 on the strike surface 527 of the projection portion 525 does not happen. Additionally or alternatively, the projection portion 525 with the strike surface 527 may be omitted. According to such an embodiment, there is only tactile feedback.

In other words, the key module 110 or key element comprises the key tappet 220 and the module housing 230. The fixing portion 521 is arranged in the key tappet 220 as a recess for a wire bracket 560. The wire bracket 560 is fixedly restrained in the fixing portion 521. The wire bracket 560 is bent with an angle of at least 90 degrees, but less than 360 degrees. A long straight portion of the wire bracket 560 extends over a majority of a width of the key tappet 220 transversally or normally with respect to the axis A of the actuation movement. A free end of the long straight portion of the wire bracket 560 rests on the strike surface 527 of the projection portion 525 in the key tappet 220. An end of the wire bracket 560 fixed to the key tappet 220 is arranged in the fixing portion 521.

Figure 6:
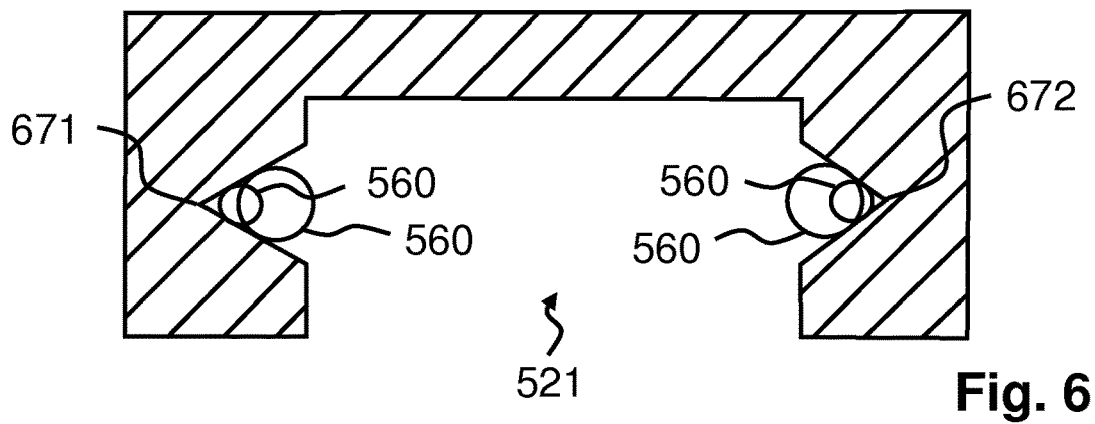
FIG. 6 shows a schematic sectional view of the fixing portion from FIG. 5.

FIG. 6 shows a schematic sectional view of the fixing portion 521 from FIG. 5. The fixing portion 521 here is depicted cut in a plane normal with respect to the axis of the actuation movement from FIG. 5. The fixing portion 521 comprises a first bearing notch 671 and a second bearing notch 672. The bearing notches 671 and 672 are formed and arranged to support the wire bracket 560. Both the first bearing notch 671 and the second bearing notch 672 and angle of less than 180 degrees or a maximum of 90 degrees in the fixing portion 521. For illustrating the support of the wire bracket 560 with different wire diameters in the bearing notches 671 and 672, part of the wire bracket 560 with a first diameter and part of a wire bracket 560 with a second diameter are depicted in each of the bearing notches 671 and 672.

Figure 7:
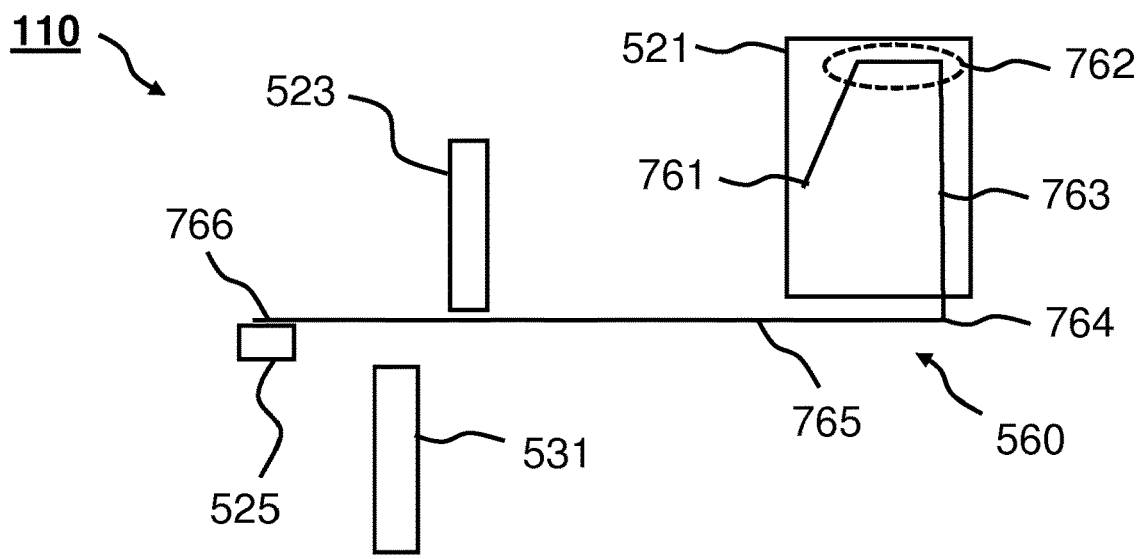
FIG. 7 shows a schematic illustration of a key module according to an embodiment of the present invention in a rest position.

FIG. 7 shows a schematic illustration of a key module 110 according to an embodiment of the present invention in a rest position. The key module 110 here corresponds to or is similar to the key module from FIG. 5. In the illustration of FIG. 7, the fixing portion 521, the inclined surface 523 and the projection portion 525 of the key tappet, the rib 531 of the module housing and the wire bracket 560 of the key module 110 are illustrated schematically. Herein, the key tappet is shown in the rest position relative to the module housing, wherein the wire bracket 560 is in a home position.

The wire bracket 560 comprises, along its longitudinal extension from one end to the other end in the given sequence, an end 761 fixed to the key tappet, a first bending region 762, a first straight portion 763, a second bending region 764, a second straight portion 765 and a free end 766. According to the embodiment illustrated here, the wire bracket 560 is bent less than 180 degrees in the first bending region 762. The wire bracket 560 is bent between 80 and 100 degrees, for example 90 degrees, in the second bending region 764. According to the embodiment illustrated here, the second straight portion 765 is longer than the first straight portion 763. In the illustration of FIG. 7, the wire bracket 560 is merely shown in a schematic way and as exemplarily bent twice in the first bending region 762. According to an embodiment, and as shown in FIG. 5, the wire bracket 560 is bent only once and in a rounded manner in the first bending region 762.

The second straight portion 765 and the free end 766 of the wire bracket 560 are elastically deflectable relative to the first straight portion 763, the first bending location 762 and the fixed end 761 in the course of the actuation movement. The end 761 fixed to the key tappet, the first bending region 762, the first straight portion 763 and at least a subsection of the second bending region 764 of the wire bracket 560 are fixed to the key tappet and arranged in the fixing portion 521. The end 761 fixed to the key tappet is supported in a first one of the bearing notches of the fixing portion 521, and the first straight portion 763 is supported in a second one of the bearing notches of the fixing portion 521. The end 761 of the wire bracket 560 fixed to the key tappet is canted or wedged in the first bearing notch of the fixing portion 521.

The end 761 fixed to the key tappet, the first bending region 762 and the first straight portion 763 of the wire bracket 560 form a barbed hook or barbed-hook portion of the wire bracket 560. In addition, according to the embodiment of the present invention illustrated here, the end 761 fixed to the key tappet comprises a sharp edge. Due to the sharp edge and/or the barbed hook, the wire bracket 560 is wedged in the fixing portion 521 for secure hold of the wire bracket 560 on the key tappet.

In the rest position, the free end 766 of the wire bracket 560 is arranged in abutment against the strike surface of the projection portion 525. The inclined surface 523 and the rib 531 are spaced from the second straight portion 765 of the wire bracket 560 in the rest position.

Figure 8:
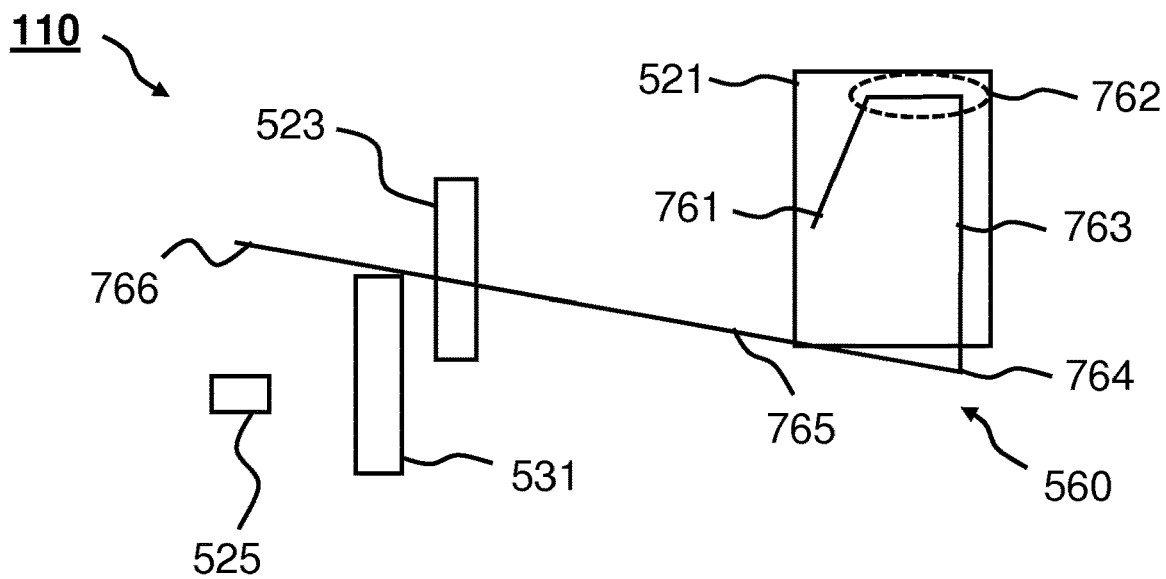
FIG. 8 shows a schematic illustration of the key module from FIG. 7 in the course of an actuation movement.

FIG. 8 shows a schematic illustration of the key module 110 from FIG. 7 in the course of the actuation movement. Herein, the illustration and arrangement of the key module 110 corresponds to those from FIG. 7 except that the key tappet is moved from the rest position in the direction of the actuated position relative to the module housing. The second straight portion 765 of the wire bracket 560 with the free end 766 of the wire bracket 560 is deflected elastically relative to the first straight portion 763, the first bending location 762 and the fixed end 761 by abutment against the inclined surface 523 against the rib 531, with a first directional component along the axis of the actuation movement and a second directional component transversal or slant with respect to the axis of the actuation movement. Herein, the free end 766 of the wire bracket 560 is spaced from the strike surface of the rejection portion 525.

Figure 9:
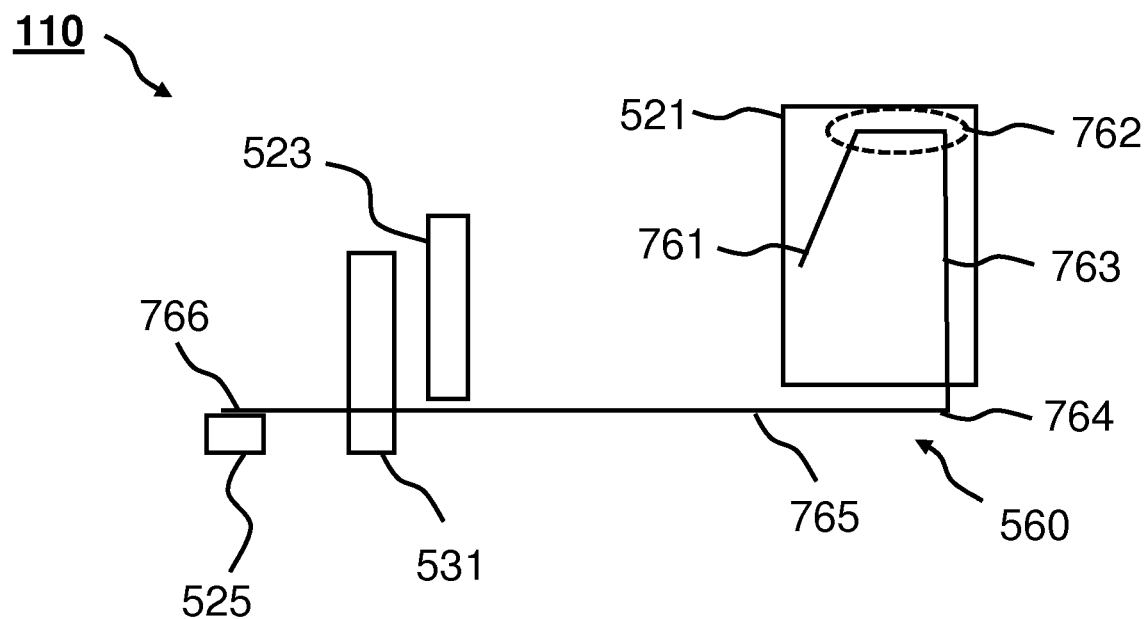
FIG. 9 shows a schematic illustration of the key module from FIG. 7 or FIG. 8 in an actuated position.

FIG. 9 shows a schematic illustration of the key module 110 from FIG. 7 or FIG. 8 in an actuated position. The illustration and arrangement of the key module 110 here correspond to those from FIG. 8 except that the key tappet is moved to the actuated position or end position or reversal position of the actuation movement relative to the module housing, wherein the wire bracket 560 is again in the home position, in which the free end 766 abuts the strike surface of the projection portion 525, after providing the tactile and acoustic feedback by sliding over the nose of the rib 531 and by impact or strike against the strike surface of the projection portion 525.

Thus, FIG. 7, FIG. 8 and FIG. 9 show a course of the actuation movement of the key module 110 from the rest position to the actuated position. With reference to the previously described figures, processes in the key module 110 in the course of the actuation movement are again explained in summary in the following. When the key tappet 220 is moved from the rest position in the direction of the actuated position along the axis A of the actuation movement, the second straight portion 765 of the wire bracket 560 abuts the abutment surface 527 of the rejection portion 525, which is part of the module housing 230. Further deflection of the wire bracket 560 along the axis A of the actuation movement thus is blocked for the time being. When the key tappet 220 is moved further along the axis A of the actuation movement in the direction of the actuated position, the second straight portion 765 with the free end 766 of the wire bracket 560 is deflected in the opposite direction along the axis A of the actuation movement and preloaded. Furthermore, the inclined surface 523 of the key tappet 220 reaches the second straight portion 765 of the wire bracket 560 and causes the second straight portion 765 of the wire bracket 560 to slide over the nose 535 of the rib 531, with mechanical stress of the wire bracket 560 suddenly decreasing. The free end 766 of the second straight portion 765 of the wire bracket 560 strikes upon the strike surface 527 of the projection portion 525 of the key tappet 220. In this process, a clearly audible clicking sound is perceptible as the acoustic feedback. Moreover, the strike may also be felt in a tactile way, because the wire bracket 560 is arranged entirely in the key tappet 220. The acoustic feedback and the tactile feedback are dependent on the wire thickness or the wire diameter of the wire bracket 560 and can be varied. When moving back to the rest position or home position along the axis of the actuation movement A, the second straight portion 765 of the wire bracket 560 is deflected by the rib 531 and moved over the nose 535 again eventually. After passing the nose 535, the wire bracket 560 again rests on the strike surface 527 of the projection portion 525, like in the rest position. The key tappet 220 may now be actuated again, and the previously-described sequence repeats.

Figure 10:
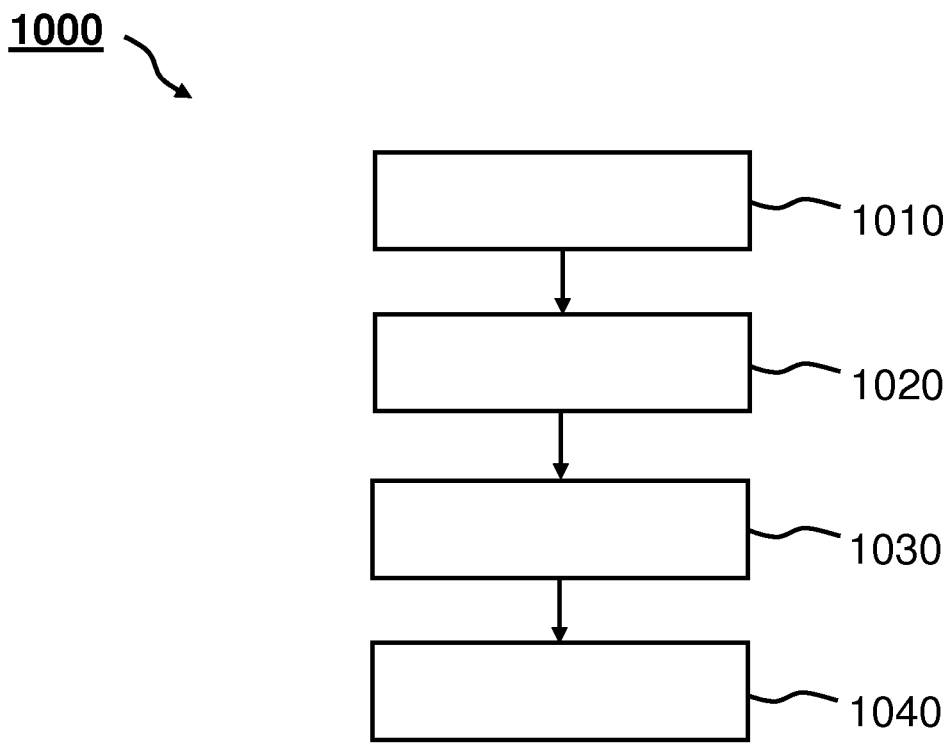
FIG. 10 shows a flowchart of a method according to an embodiment of the present invention.

FIG. 10 shows a flowchart of a method 1000 according to an embodiment of the present invention. The method 1000 is executable for providing a key tappet of a key module for a keyboard with a wire bracket for providing tactile and/or acoustic feedback. The method 1000 for providing is executable using a manufacturing machine. In particular, the method 1000 for providing is executable using a single manufacturing machine. By executing the method 1000 for providing, the key tappet and the wire bracket of the key module from one of the previously described figures or of a similar key module can be produced or provided.

In a step 1010 of feeding, both the key tappet and wire from a reel are fed into the manufacturing machine. Subsequently, in a step 1020 of bending, the wire is bent with an overall bending angle of less than 360 degrees using the manufacturing machine, in order to form the wire bracket. Subsequently, in a step 1030 of separating, the formed wire bracket is separated from the wire on the reel using the manufacturing machine. In other words, in the step 1030 of separating, the wire is cut to length. Subsequently, in a step 1040 of fixing, the wire bracket is fixed to the key tappet using the manufacturing machine. In the step 1040 of fixing, the wire bracket is press-fit into the key tappet, for example.

Figure 11:
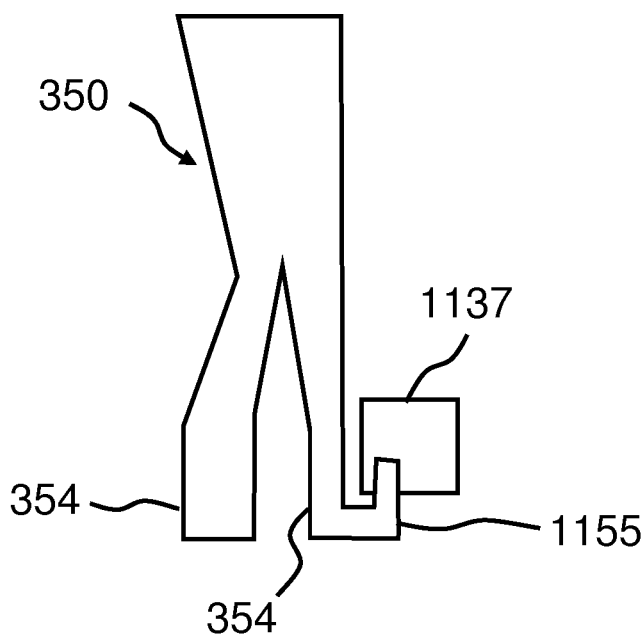
FIG. 11 shows a schematic bottom view of a subsection of a key module according to an embodiment of the present invention.

FIG. 11 shows a schematic bottom view of a subsection of the key module according to an embodiment of the present invention. In the illustration of FIG. 11, the trigger element 350 with for example only two contact fingers 354 and an abutment surface 1137 of the module housing are shown of the key module. The key module in FIG. 11 corresponds to the key module from one of the previously described figures, except that the module housing comprises the abutment surface 1137. The abutment surface 1137 is formed and arranged so that the trigger element 350 is arranged so as to abut on the abutment surface 1137 in the rest position of the key tappet of the key module.

According to the embodiment illustrated here, one of the contact fingers 354 is arranged so as to abut on the abutment surface 1137 in the rest position of the key tappet of the key module. To this end, the trigger element 350 has a rest portion 1155 on the contact finger 354 in question. In the rest position, there is mechanical contact between the rest portion 1155 and the abutment surface 1137. In other words, the rest portion 1155 abuts on the abutment surface 1137 in the rest position.

By the trigger element 350 or the contactor abutting on the abutment surface 1137 as a stop in the rest position, undesired vibrations of the trigger element 350, in particular also of the contact fingers 354, can be dampened or prevented.

Figure 12:
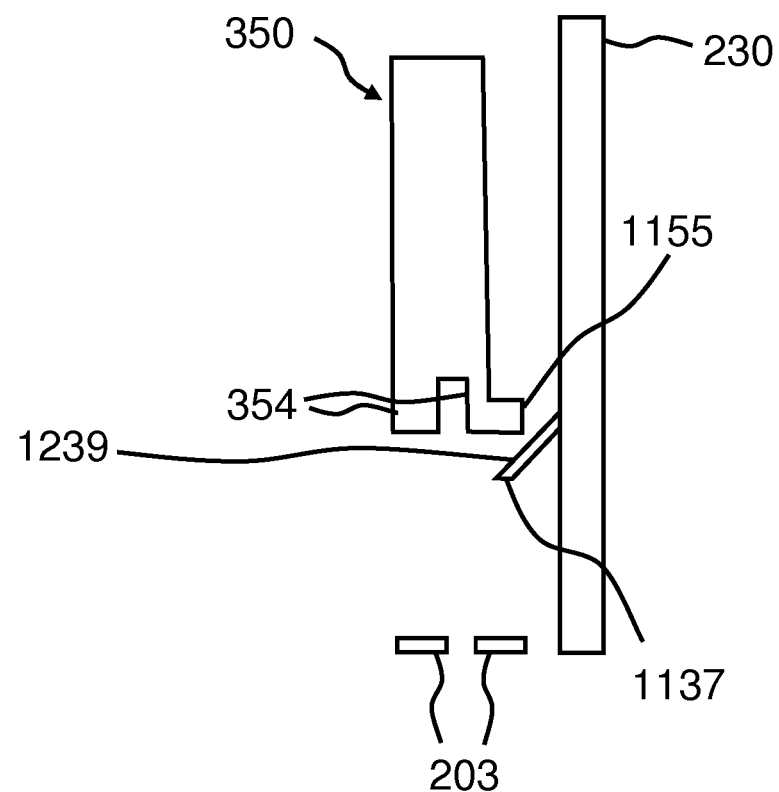
FIG. 12 shows a partially sectional view of a subsection of a keyboard according to an embodiment of the present invention with a key module prior to assembly or first-time actuation.

FIG. 12 shows a partially sectional view of a subsection of a keyboard according to an embodiment of the present invention with a key module prior to assembly or first-time actuation. The keyboard is the keyboard from one of the previously described figures. The key module corresponds to or resembles the key module from FIG. 11, wherein in the illustration of FIG. 12 a sidewall of the module housing 230 with a damper portion comprising the abutment surface 1137 and an inclined surface 1239 and the trigger element 350 with the for example only two contact fingers 354 and the rest portion 1155 are shown of the key module and additionally two contact pads 203 of the circuit substrate are shown of the keyboard.

In FIG. 12, what is shown is a state prior to assembly or first-time actuation of the key module of the keyboard. Prior to the assembly or first-time actuation, the damper portion with the abutment surface 1137 and the inclined surface 1239 is arranged between the trigger element 350 and the contact pads 203. The inclined surface 1239 is formed to enable or cause first-time and non-recurring sliding of the trigger element 350. The abutment surface 1137 may be oriented at an acute angle or parallel to the inclined surface 1239. The abutment surface 1137 at least is formed such that sliding back to the position prior to the assembly or first-time actuation is prevented.

During assembly or first-time actuation of the key module, the trigger element 350 can be deflected along the inclined surface 1239 and guided past the damper portion for the first and only time and thus slide past the damper portion. Additionally or alternatively, when the trigger element 350 is sliding across the inclined surface 1239, the damper portion, particularly the inclined surface 1239, can be deflected. Thus, in addition to or as an alternative to the trigger element 350, also the damper portion may comprise flexible material.

Figure 13:
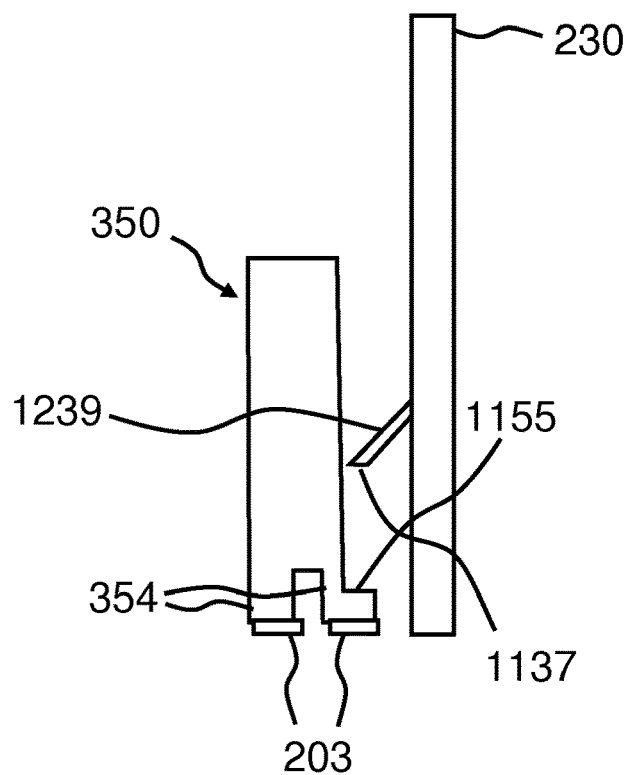
FIG. 13 shows a partially sectional view of the subsection of the keyboard from FIG. 12 with the key module in an actuated position.

FIG. 13 shows a partially sectional view of the subsection of the keyboard from FIG. 12 with the key module in an actuated position. Here, the illustration in FIG. 13 corresponds to the illustration from FIG. 12 except for the key module being shown in the actuated position, wherein electric contact is established between contact fingers 354 and the contact pads 203. Here, the contact fingers 354 and the rest portion 1155 are arranged between the contact pads 203 and the damper portion with the abutment surface 1137 and the inclined surface 1239 formed on the module housing 230. Also, the rest portion 1155 is spaced from the damper portion, in particular the abutment surface 1137, here. Starting from the state illustrated in FIG. 12 and moving to the state shown in FIG. 13, the rest portion 1155 of the trigger element 350 has slid past on the inclined surface 1239 and the abutment surface 1137 for the first and only time.

Figure 14:
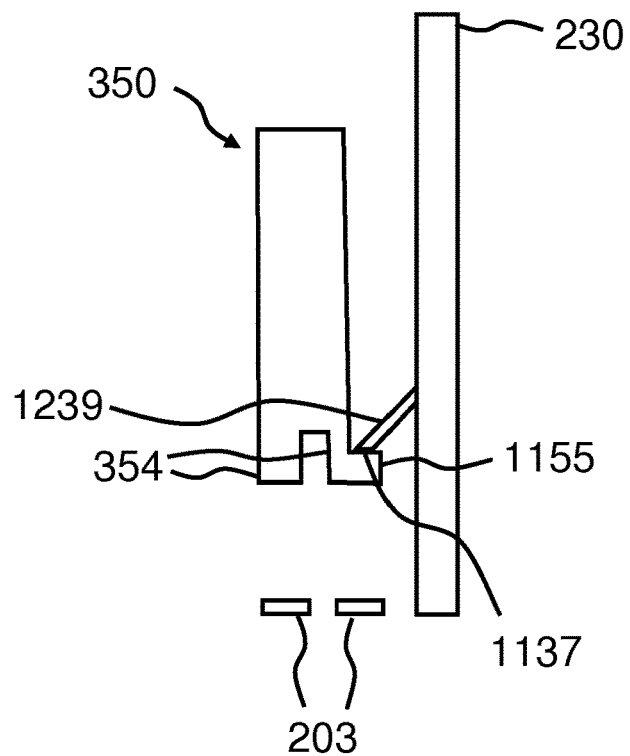
FIG. 14 shows a partially sectional view of the subsection of the keyboard from FIG. 12 or FIG. 13 with the key module in a rest position.

FIG. 14 shows a partially sectional view of the subsection of the keyboard from FIG. 12 or FIG. 13 with the key module in a rest position. Here, the illustration in FIG. 14 corresponds to the illustration from FIG. 13, except that the key module is shown in the rest position, wherein the rest portion 1155 of the trigger element 350 abuts on the abutment surface 1137. Noise due to vibrations of the trigger element 350, in particular the contact fingers 354, can thus be prevented. The trigger element 350, more specifically the rest portion 1155, cannot slide back across the damper portion again to reach the state shown in FIG. 12, for example. The rest portion 1155 engages behind the abutment surface 1137, for example.

According to an embodiment and with reference to the previously described figures, in an assembly method for assembling the key module 110, the key tappet 220 with the trigger element 350 arranged thereon can be inserted into the module housing 230. Here, a relative movement of the key tappet 220 with the trigger element 350 with respect to the module housing 230 can be effected along the axis A of the actuation movement. The trigger element 350 and/or the damper portion or the inclined surface 1239 also is deflected during this relative movement so that the trigger element 350 is guided past the damper portion and slides past the damper portion for the first and only time. The relative movement takes place when inserting the key tappet 220 including the trigger element 350 into the module housing 230 at least until the rest position is reached. By the trigger element 350 abutting on the abutment surface 1137, return of the key tappet 220 or the trigger element 350 to a position like prior to assembly, see FIG. 12, is prevented.

Figure 15:
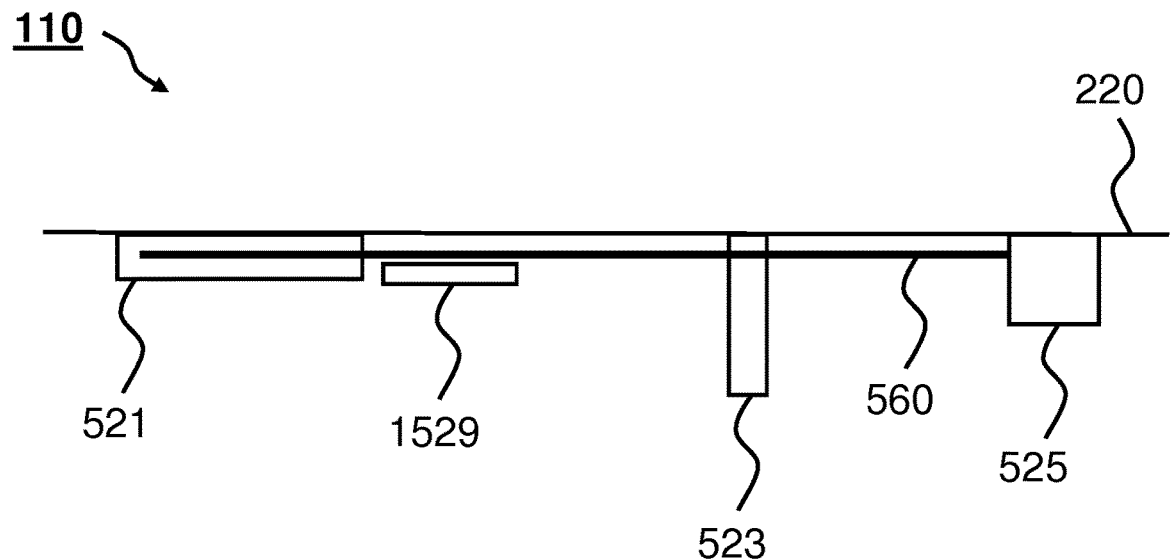
FIG. 15 shows a schematic illustration of a key module according to an embodiment of the present invention in a rest position.

FIG. 15 shows a schematic illustration of a key module 110 according to an embodiment of the present invention in a rest position. Here, the key module 110 corresponds to the key module from FIG. 5 or FIG. 7, except that the key tappet 220 further comprises a retaining portion 1529 for retaining the wire bracket 560 against movement away from a wall of the key tappet 220 in the course of the actuation movement.

In the illustration of FIG. 15, the wall of the key tappet 220, the fixing portion 521, the inclined surface 523 and the projection portion 525, the wire bracket 560 and the retaining portion 1529 are shown of the key module 110. Thus, in FIG. 15, more specifically, subsections of the key tappet 220 and the wire bracket 560 are illustrated of the key module 110.

The retaining portion 1529 is arranged between the fixing portion 521 and the inclined surface 523. Also, the retaining portion 1529 is arranged adjacent to the fixing portion 521. The retaining portion 1529 is formed as a protrusion or guiding protrusion. A subsection of the wire bracket 560 is arranged or accommodated between the retaining portion 1529 and the wall of the key tappet 220. In particular, a subsection of the second straight portion of the wire bracket 560 adjacent to the second bent portion of the wire bracket is arranged or accommodated between the retaining portion 1529 and the wall of the key tappet 220.

In particular, the retaining portion 1529 causes the wire bracket 562 return exactly to its starting position following the actuation movement. Thus, also a reproducible clicking sound can be achieved, because the free end of the wire bracket is reliably guided back to the strike surface. When the wire bracket 560 is deflected, the retaining portion 1529 causes parallel or substantially parallel orientation of the wire bracket 560 relative to the wall of the key tappet 220. In other words, the retaining portion 1529 impedes lateral swiveling of the wire bracket 560. Due to the lever arm being shortened by the retaining portion 1529, mechanical tension can also be built up or increased in the second straight portion of the wire bracket 560, whereby the wire bracket 560 may swivel back exactly to its starting position. The retaining portion 1529 holes the wire bracket 560 or the end of the second straight portion of the wire bracket 560 in position.

Figure 16:
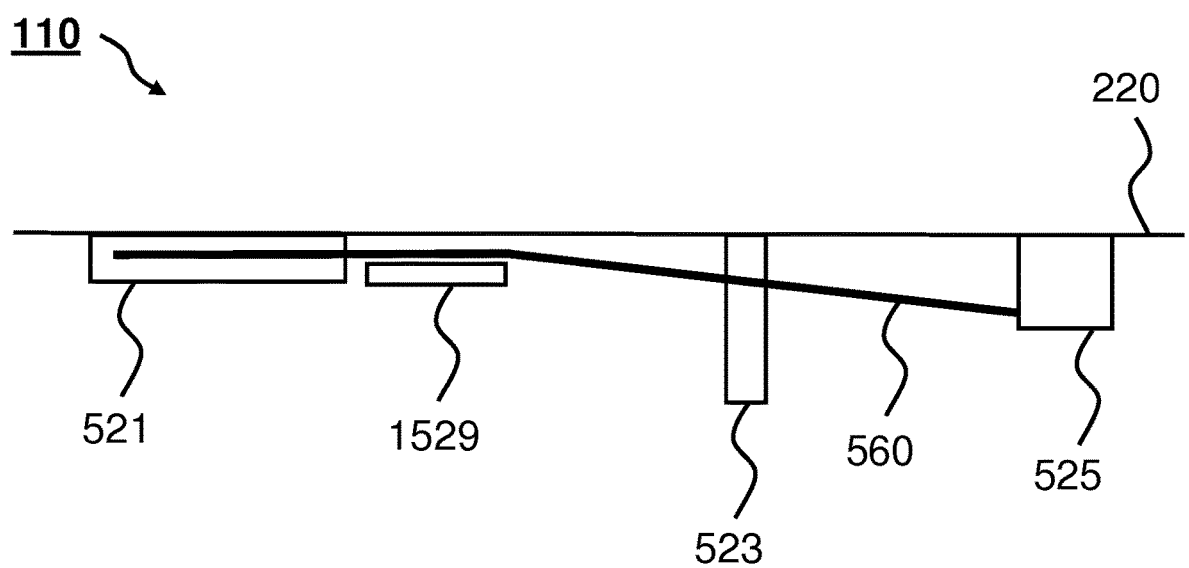
FIG. 16 shows a schematic illustration of the key module from FIG. 15 with deflected wire bracket.

FIG. 16 shows a schematic illustration of the key module 110 from FIG. 15 with deflected wire bracket 560. The illustration in FIG. 16 corresponds to the illustration from FIG. 15, except that the second or long straight portion of the wire bracket 560 is bent on an edge of the retaining portion 1529 in the course of the actuation movement. This is a planned deflection for a return to the rest position. Thus, the deflection of the wire bracket 560 is shown in FIG. 16. The retaining portion 1529 has the effect that the wire bracket is tightly fixed in the fixing portion 521 and is neither bent nor twisted. By way of the guidance of the retaining portion 1529, the lever arm is shortened and higher tension is built up, which assists the return to the rest position. In the course of the actuation movement, the wire bracket 560 is deflected twice. A first time when deflected for producing the clicking sound by the inclined surface 523 of the key tappet 220. A second time by the rib of the module housing during a return to the rest position. Both times the retaining portion 1529 causes the wire bracket 562 rest again on the strike surface of the projection portion 525. The retaining portion 1529 has the function of laterally limiting the deflection of the wire bracket 560.

With reference to the previously described figures, an embodiment of the present invention is described in summary and with other words in the following. According to an embodiment, the key module 110 comprises an integral or one-part module housing 230 and an integral or one-part key tappet 220. The housing stop 332 for the key tappet 220 is formed in the module housing 230. The fixing portion 521 for the wire bracket 560 is formed as a recess in the key tappet 220. The fixing portion 521 has a trapezoidal cross-sectional profile. Due to the support of the wire bracket 530 in the bearing notches 671 and 672, various wire brackets 560 with different thicknesses of the wire can be fixed in an easy and reliable way. When supported in the bearing notches 671 and 672, the wire of the wire bracket 560 is automatically centered and aligned exactly with respect to position or location, and break-away and twisting of the wire bracket 560 thus are avoided. The wire bracket 560 may also be referred to as elastic means. Different thicknesses of the wire of the wire bracket 560 result in a different clicking sound. The wire bracket 560 is exclusively or entirely arranged in the movable key tappet 220. It is the function of the wire bracket 562 enable tactile feedback and acoustic feedback, or optionally only tactile feedback, wherein the second straight portion 765 of the wire bracket 560 may be shortened. The fixed end 761 of the wire bracket 560 and the fixing portion 521 functions as a protection against the wire bracket 560 falling out of the fixing portion 521. To this end, the fixed end 761 points away from the first bending region 762 in a direction transverse with respect to the axis A of the actuation movement. The fixed end 761 comprises a sharp edge so that the wire bracket 560 bores into the plastics of the key tappet or the fixing portion 521 and continues to which there in the case of tensile loading in the direction out of the fixing portion 521. The inclined surface 523 is formed as a landing or protrusion with an inclined face or surface of subsidence the key tappet 220. The inclined surface 523 extends as a landing from a bottom of the key tappet 220 facing the module housing 232 and intermediate bottom in the middle of the key tappet 220, wherein the landing is tapered toward the bottom of the key tappet 220 so as to form the inclined face. The inclined surface 523 is formed to deflect the second straight portion 764 of the wire bracket 560 transversally with respect to the axis A of the actuation movement and move it past of the nose 535 of the module housing 230 so as to generate the acoustic feedback by striking onto the striking surface 527 of the key tappet 220. The rib 531 is tapered from the nose 535 toward a bottom of the module housing 230. The abutment surface 533 of the rib 531 is formed to deflect or preload the second straight portion 764 of the wire bracket 560 in the direction of the inclined surface 523 along the axis A of the actuation movement in the course of an actuation movement of the key tappet 220 toward the actuated position. The rib 531 is formed to guide the second straight portion 764 of the wire bracket 560 over the nose 535 in the course of an actuation movement of the key tappet 220 toward the rest position or effect a return over the abutment surface 533. The projection portion 525 and the strike surface 527 are formed to generate the acoustic feedback to a meeting or impact of the second straight portion 764 of the wire bracket 560 with the strike surface 527. The abutment surface 533 is also formed to function as a rest surface for the second straight portion 764 of the wire bracket 560 in the rest position.

If an embodiment comprises an "and/or" connection between a first feature and a second feature, this may be read to mean that the embodiment comprises both the first feature and the second feature according to one embodiment and either only the first feature or only the second feature according to a further embodiment.

REFERENCE NUMERALS 100 keyboard
102 circuit substrate
104 fixing element
106 keycap
110 key module 201 hole
203 contact pads
205 electronic devices
207 holding opening
220 key tappet
230 module housing
322 coupling portion
324 tappet stop
326 surface portion
328 guiding stud
332 housing stop
334 positioning protrusion
336 mounting portion
338 flange
340 elastic means
350 trigger element
352 attachment portion
354 contactor finger
521 fixing portion
523 inclined surface
525 projection portion
527 strike surface
531 rib
533 abutment surface
535 nose
560 wire bracket
A actuation axis or axis of the actuation movement
671 first bearing notch
672 second bearing notch
761 fixed end
762 first bending region
763 first straight portion
764 second bending region
765 second straight portion
766 free end
1000 method for providing
1010 step of feeding
1020 step of bending
1030 step of separating
1040 step of fixing
1137 abutment surface
1155 rest portion
1239 inclined surface
1529 retaining portion

The invention claimed is:

1. A key module for a keyboard, wherein the key module comprises:
    a key tappet, wherein the key tappet comprises a coupling portion for coupling to a keycap for the key module;
    a module housing, wherein the module housing is formed to movably accommodate the key tappet, in order to enable a translational actuation movement of the key tappet between a rest position and an actuated position relative to the module housing; and
    a wire bracket for providing tactile and/or acoustic feedback, wherein the wire bracket is elastically deflectable in the course of the actuation movement, wherein the wire bracket is bent with an overall bending angle of less than 360 degrees, wherein the wire bracket is fixed to the key tappet;
    wherein the key tappet comprises a fixing portion for fixing the wire bracket to the key tappet, wherein the fixing portion comprises two bearing notches for supporting the wire bracket, wherein each of the bearing notches has an opening angle of less than 180 degrees.

2. The key module according to claim 1, wherein the wire bracket comprises a first bending region and a second bending region, wherein the wire bracket is bent less than 180 degrees in the first bending region, wherein the wire bracket is bent between 45 and 135 degrees in the second bending region.

3. The key module according to claim 1, wherein the wire bracket is formed like a barbed hook in a subsection and/or has a sharp edge at an end of the wire bracket fixed to the key tappet.

4. The key module according to claim 1, wherein the key tappet comprises an inclined surface obliquely inclined with respect to an axis of the actuation movement, wherein the module housing comprises a rib obliquely inclined with respect to the axis of the actuation movement and having a nose and an abutment surface inclined normally with respect to the axis of the actuation movement, wherein the inclined surface, the rib, the abutment surface and the nose are formed to elastically deflect and suddenly release the wire bracket in the course of the actuation movement.

5. The key module according to claim 1, wherein the key tappet comprises a projection portion with a strike surface inclined normally with respect to axis of the actuation movement, wherein the strike surface and the wire bracket are formed and arranged to cause the wire bracket to strike onto the strike surface in the course of the actuation movement for the acoustic and/or tactile feedback.

6. The key module according to claim 1, wherein the key tappet comprises a retaining portion for retaining the wire bracket against movement away from a wall of the key tappet and/or for retaining the wire bracket against movement transversal to an axis of the actuation movement of the key tappet in the course of the actuation movement.

7. The key module according to claim 1, wherein the module housing is integrally formed, wherein the module housing comprises at least one positioning protrusion for positioning the key module on the circuit substrate of the keyboard, wherein the module housing comprises at least one mounting portion for mounting key module in the keyboard with positive locking and/or non-positive locking.

8. The key module according to claim 1, wherein the key tappet comprises at least one guiding portion for guiding the translational actuation movement of the key tappet, wherein the at least one guiding portion of the key tappet comprises a surface portion of the key tappet and/or a guiding stud formed to plunge into a bulge of the module housing during the actuation movement, wherein the bulge comprises the positioning protrusion.

9. The key module according to claim 1, wherein the key tappet comprises at least one tappet stop for limiting the actuation movement, wherein the module housing comprises at least one housing stop for abutment against the at least one tappet stop of the key tappet in the rest position of the key tappet, wherein the key module comprises elastic means, with the elastic means being formed to bias the key tappet into the rest position in an assembled state of the key module.

10. The key module according to claim 1, wherein the key tappet is formed of translucent material or opaque material, wherein the module housing is formed of translucent material or opaque material.

11. The key module according to claim 1, comprising a trigger element for triggering a switch signal of the key module in response to the actuation movement, wherein the trigger element is attached to the key tappet, wherein the trigger element is a contactor for electrically shorting contact pads of the circuit substrate of the keyboard, wherein the trigger element comprises at least one contact finger elastically deflectable in the course of the actuation movement for contacting the contact pads while generating friction and an attachment portion for attaching the trigger element to the key tappet.

12. The key module according to claim 11, wherein the module housing comprises an abutment surface, wherein the trigger element is arranged so as to abut on the abutment surface in the rest position of the key tappet.

13. The keyboard, wherein the keyboard comprises:
   at least one key module according to claim 1; and
   the circuit substrate, wherein the at least one key module is arranged on the circuit substrate.

14. The keyboard according to claim 13, wherein the circuit substrate comprises at least one hole into which the at least one positioning protrusion of the module housing of the at least one key module is introduced, and/or wherein the at least one key module and the circuit substrate are connected to each other exclusively with positive locking and/or non-positive locking, and/or wherein at least one light-emitting diode for illuminating the at least one key module and/or further electronic devices and/or contact pads electrically connected to each other upon actuation of the at least one are arranged on or in the circuit substrate.

15. The keyboard according to claim 13, comprising a fixing element for fixing the at least one key module to the circuit substrate, wherein the fixing element is a keyframe between the circuit substrate and a keyboard top or a keyboard top.

* * * * *